(No Model.)

C. H. LYNDE.
GRAIN BINDER AND CORN HUSKER COMBINED.

No. 265,269. Patented Oct. 3, 1882.

Witnesses.                                        Inventor.

United States Patent Office.

CHARLES H. LYNDE, OF MARLBOROUGH, ASSIGNOR OF ONE-HALF TO WILLIAM W. WHITACRE, OF CLEVELAND, OHIO.

GRAIN-BINDER AND CORN-HUSKER COMBINED.

SPECIFICATION forming part of Letters Patent No. 265,269, dated October 3, 1882.

Application filed April 13, 1882. (No model.)

*To all whom it may concern:*

Be it known that I, CHARLES H. LYNDE, of Marlborough, in the county of Stark and State of Ohio, have invented a certain new and Improved Grain-Binder and Corn-Husker Combined; and I do hereby declare that the following is a full, clear, and complete description thereof.

My invention relates to a grain-binder and corn-husker combined, which may be used in binding other articles; and it consists of an implement as hereinafter more fully described.

Reference will be had to the following specification, and to the annexed drawings, making part of the same, for a full and complete description of the said implement and the mode of using it.

Figure 1:
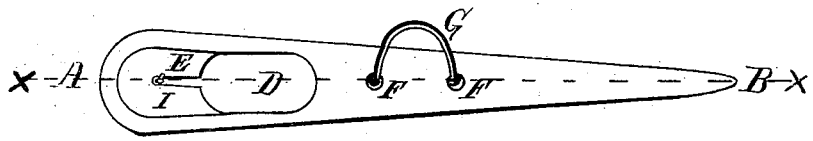
Figure 2:
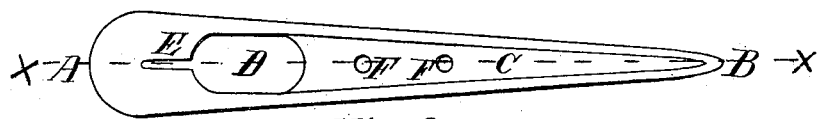
Figure 3:
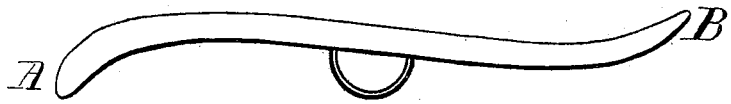
Figure 4:
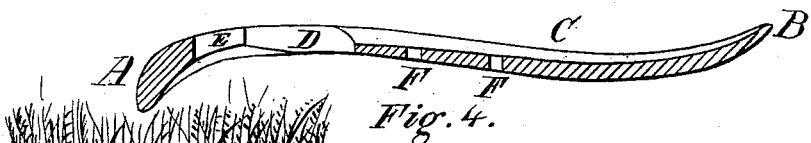
Figure 5:
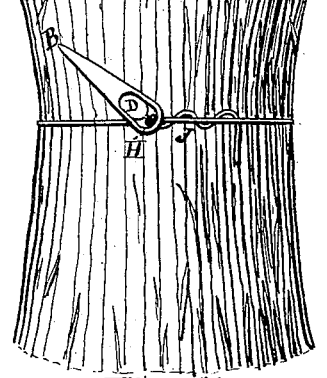
Figure 6:
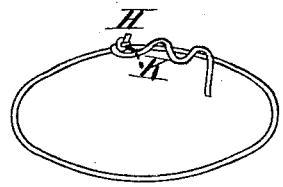

Figure 1 is a top view of the implement; Fig. 2, a view of the opposite side of Fig. 1; Fig. 3, a side view; Fig. 4, a longitudinal section in the line $x\,x$, Figs. 1 and 2. Figs. 5 and 6 illustrate the mode of binding with the implement.

Like letters of reference refer to like parts in the several views.

The general form of the implement is shown in Figs. 1, 3, and 4. From the heel A it tapers to a point at the point end B. It also curves longitudinally from the heel to the point, as seen in Figs. 3 and 4. Along the central part on one side is a groove or flute, C, which extends to near the point, the other end terminating in the opening D. Connected with the opening is a slot, E. In the central part of the implement are two holes, F, in which is secured the removable holder G; or it may be otherwise connected to the article.

In using the implement for binding gavels of grain the cord or lathious are first cut the proper length, with a knot, H, made in one end, of sufficient size to be held from passing through the slot E. The cord adjoining the knot is slipped into the slot E, so that the knot will be in the concave position I of the heel below the surface of the implement, so that the knot will be out of the way in binding the gavel. With the knotted end in the slot, as stated, and the implement held in the right hand, the gavel being at the same time taken up, the cord is passed and looped around it below the knot under the heel of the implement and drawn tightly, the loose end of the cord being passed between the cord next to the bundle, as indicated at J, Fig. 5.

The implement is then moved in the line of the slot, so as to allow the knot to slip out of the slot through the opening D, and is then held by the loop K, formed by the entwinings of the loose end and the cord adjoining the bundle in Fig. 6. To unbind the bundle it is only required to pull the loose end of the cord from between the bundle and the tie. The reaction or spring of the compressed bundle will be sufficient to hold the cord passed between the bundle and the cord of the loose end of the string from slipping and untying the bundle.

The knot could not be well or conveniently held by hand for receiving the loop; but with the implement the knotted cord is easily and readily held for forming the loop around it, and is quickly released when the loop is made, so that the looping of the knot and tying of the bundle are done with greater ease and rapidity than by hand.

When used as a corn-husker the finger is inserted in the holder G, which may be a strip of leather, or a cord with the ends passing through the holes F and fastened in such way as to be detachable. In using the implement as a corn-husker it is held in the hand with the first or second finger through the loop to prevent its falling from the hand in stripping off the husks, which is done by forcing the point B into the husks, and then stripping them off. The husking is done in this way with less labor and with more rapidity than in the usual way.

The implement is found of great use in the corn-field, by the use of which the corn can be husked and the stalks or fodder bound more rapidly and securely and with less labor than can be done by the ordinary mode of hard work.

What I claim as my invention, and desire to secure by Letters Patent, is—

The compound tool or implement herein described, the same provided with a curved pointed end, B, and a rounded curved heel, A, with an opening, D, and slot E near one end thereof for the prepared bands, and a loop, G, substantially as and for the purposes set forth.

In testimony whereof I affix my signature in presence of two witnesses.

CHARLES H. LYNDE.

Witnesses:
O. B. HOOVER,
JAS. W. COULTER.